N. YOUNG.
Improvement in Washing-Machines.
No. 127,668. Patented June 4, 1872.
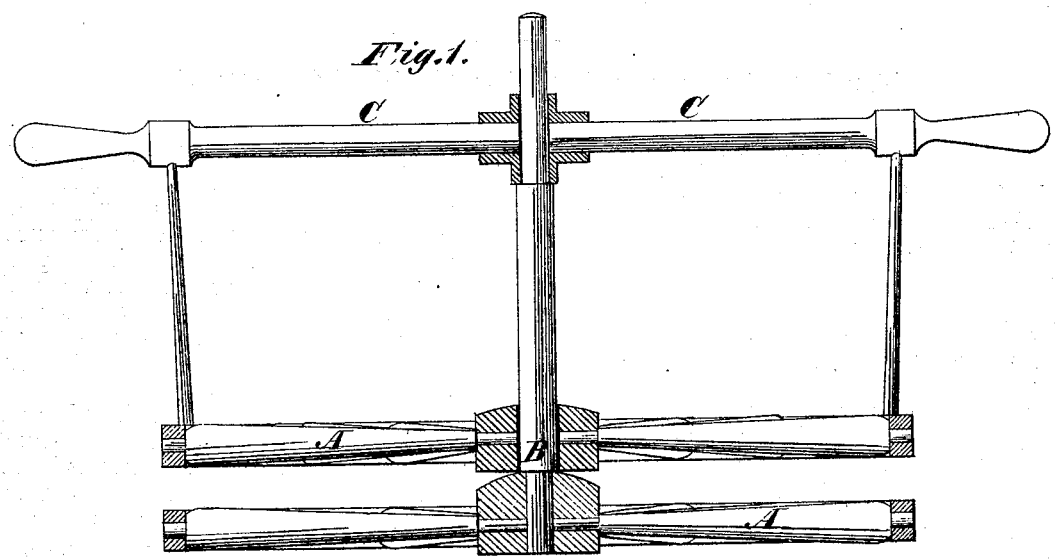
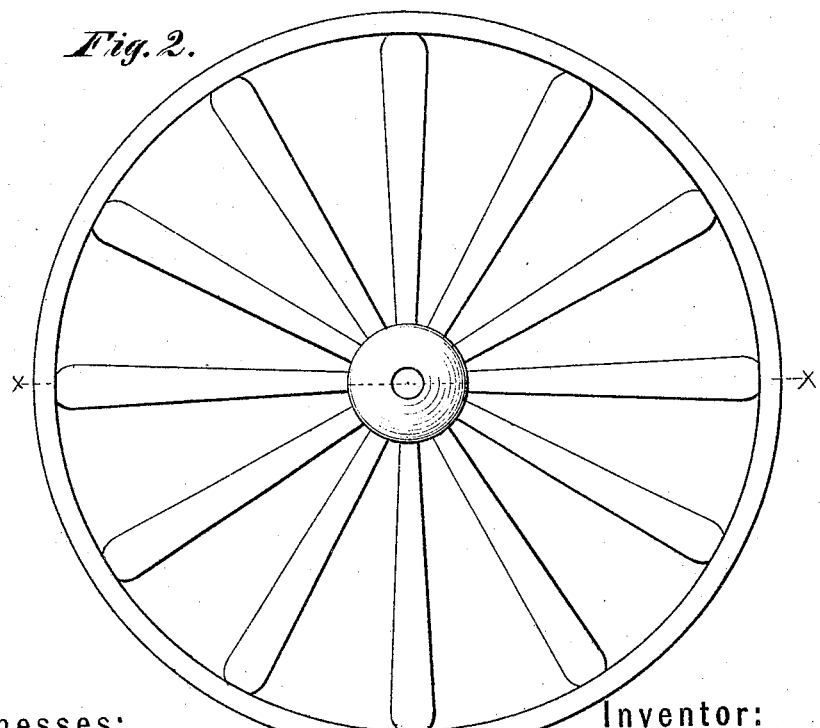
Witnesses:
Jeremiah W. Ladd.
W. C. Sturoc
Inventor:
Nathan Young.

127,668

UNITED STATES PATENT OFFICE.

NATHAN YOUNG, OF SUNAPEE, NEW HAMPSHIRE.

IMPROVEMENT IN WASHING-MACHINES.

Specification forming part of Letters Patent No. 127,668, dated June 4, 1872.

SPECIFICATION.

*To all whom it may concern:*

Be it known that I, NATHAN YOUNG, of Sunapee, in the county of Sullivan and State of New Hampshire, have invented a new and useful Improvement in Washing-Machines; and I do hereby declare that the following is a full, and exact description of the construction and operation of the same, reference being had to the annexed drawing making a part of this specification, in which—

Figure 1 is a center section of the whole machine, and Fig. 2 is a horizontal face view of the upper and lower halves of the machine.

And to enable others skilled in the mechanic arts to make and use my invention I will now describe its construction and operation.

The "wheels" which constitute its upper and lower halves are made in the ordinary manner in which wheels with bent whole rims are made. The peculiarity of the wheel part is in the specific shape of the "spokes" and the "dishing" on the lower side of the upper half and the upper side of the under half, into which the center post B is fastened. The spokes are tenoned into the hubs in the common way. The spokes A are made tapering toward the hub, for the useful purpose of keeping the clothes placed between the two wheels spread out evenly, and thus exposed to nearly a uniform pressure, so that the cleansing process goes on rapidly and thoroughly. The round edge of the spokes A coming in contact with the clothes on the under and upper side of the mass at the same time is found to execute the work in a manner nearest resembling hand-washing; and the spaces between the spokes permit the suds and water to play up and down in such a way as to combine a "washing" or "squeezing," and at the same time a "rinsing" process in one operation.

The size of the machine may be adapted to any common wash-tub, and being constructed exclusively of hard smooth materials it is not liable to soak up large quantities of water and thus become heavy and unfit for use. The machine is operated by a cross-handle, C, and has a reciprocating motion.

I do not claim the mere combination of an upper and an under half in a washing-machine, nor the reciprocating motion, for these are common to a large class of machines; but

What I claim, and desire to secure by Letters Patent, is—

The combination of the two wheels A A with their dishing sides, constructed and operated substantially in the manner and for the purposes herein specified.

NATHAN YOUNG.

Witnesses:
W. C. STUROE,
JEREMIAH W. LADD.